United States Patent
Karb et al.

(10) Patent No.: US 9,718,233 B2
(45) Date of Patent: Aug. 1, 2017

(54) METHOD AND APPARATUS FOR PRODUCING LAID FIBRE FABRICS AND COMPONENT PREFORMS MADE OF FIBRES

(75) Inventors: Ingo Karb, Flacht (DE); Volker Witzel, Loechgau (DE)

(73) Assignee: COMPOSITENCE GMBH, Leonberg (DE)

( * ) Notice: Subject to any disclaimer, the term of this patent is extended or adjusted under 35 U.S.C. 154(b) by 639 days.

(21) Appl. No.: 14/115,552

(22) PCT Filed: Mar. 30, 2012

(86) PCT No.: PCT/EP2012/001422
§ 371 (c)(1),
(2), (4) Date: Nov. 4, 2013

(87) PCT Pub. No.: WO2012/149990
PCT Pub. Date: Nov. 8, 2012

(65) Prior Publication Data
US 2014/0103571 A1      Apr. 17, 2014

(30) Foreign Application Priority Data

May 5, 2011   (DE) .................. 10 2011 100 640

(51) Int. Cl.
*B29C 70/38*   (2006.01)
*B29C 55/02*   (2006.01)
(Continued)

(52) U.S. Cl.
CPC .............. *B29C 55/02* (2013.01); *B29B 11/16* (2013.01); *B29C 70/541* (2013.01); *B29C 70/56* (2013.01); *B29C 70/207* (2013.01)

(58) Field of Classification Search
CPC ............................. B29C 70/56; B29C 70/207
See application file for complete search history.

(56) References Cited

U.S. PATENT DOCUMENTS 2,964,442 A * 12/1960 Hansen ................ B29C 51/004
156/172
3,115,678 A * 12/1963 Keen .................... B29C 51/145
264/322

(Continued)

FOREIGN PATENT DOCUMENTS

CN      101304859 B      11/2008
CN      101657575 B       2/2010
(Continued)

OTHER PUBLICATIONS

Communication mailed Feb. 10, 2015 from EPO in related EP application No. 12 713 881.6, including English translation of substantive portions.
(Continued)

*Primary Examiner* — Galen Hauth
(74) *Attorney, Agent, or Firm* — J-TEK LAW PLLC; Jeffrey D. Tekanic; Scott T. Wakeman

(57) ABSTRACT

A method for manufacturing a fiber layer or a component perform includes yieldably tensioning a plurality of yarns in a tensioning plane such that each yarn is separately and individually held in a yieldable manner. Then, a workpiece carrier is moved through the tensioning plane in a perpendicular direction thereto such that the yarns contact the workpiece carrier and respectively bend according to the contour of the workpiece carrier. If a predetermined tensile force on one or more of the plurality of yarns is exceeded, then an additional length of such yarn(s) is supplied from a reserve and/or a coil to cover the workpiece carrier. Then, the ends of the yarns are fixed along an edge of the workpiece carrier.

30 Claims, 4 Drawing Sheets

(51) Int. Cl.
  *B29B 11/16* (2006.01)
  *B29C 70/54* (2006.01)
  *B29C 70/56* (2006.01)
  *B29C 70/20* (2006.01)

(56) References Cited

U.S. PATENT DOCUMENTS

| | | | |
|---|---|---|---|
| 4,432,716 A | 2/1984 | Kiss | |
| 5,134,002 A | 7/1992 | Vallier | |
| 5,344,687 A | 9/1994 | Grimnes | |
| 5,645,677 A | 7/1997 | Cahuzac et al. | |
| 6,054,003 A * | 4/2000 | Bak | B29C 70/541 156/180 |
| 6,585,842 B1 | 7/2003 | Bompard et al. | |
| 8,580,060 B2 | 11/2013 | Bech | |
| 2003/0133691 A1* | 7/2003 | Levert | G02B 6/3636 385/147 |
| 2005/0139324 A1 | 6/2005 | Meyer | |
| 2005/0268832 A1 | 12/2005 | Beneventi et al. | |
| 2006/0169396 A1 | 8/2006 | Joern | |
| 2009/0202789 A1 | 8/2009 | Wagner et al. | |
| 2009/0229760 A1 | 9/2009 | Hamlyn et al. | |
| 2010/0126652 A1 | 5/2010 | Joern et al. | |
| 2010/0170628 A1 | 7/2010 | Yoshikawa et al. | |
| 2010/0206994 A1 | 8/2010 | Barber | |
| 2011/0000608 A1 | 1/2011 | Bech | |
| 2011/0083605 A1 | 4/2011 | Vermilyea et al. | |
| 2011/0104364 A1 | 5/2011 | Chen | |
| 2011/0115124 A1 | 5/2011 | Barlag | |
| 2011/0148007 A1 | 6/2011 | Piepenbrock et al. | |
| 2012/0073730 A1 | 3/2012 | Nieuwenhove et al. | |
| 2012/0247651 A1 | 10/2012 | Nieuwenhove et al. | |
| 2013/0174969 A1 | 7/2013 | Karb et al. | |
| 2013/0175723 A1 | 7/2013 | Luebbering et al. | |
| 2014/0035195 A1 | 2/2014 | Goettinger et al. | |
| 2014/0041795 A1 | 2/2014 | Goettinger et al. | |
| 2014/0131914 A1 | 5/2014 | Goettinger et al. | |

FOREIGN PATENT DOCUMENTS

| | | |
|---|---|---|
| DE | 3003666 A1 | 8/1981 |
| DE | 3027655 A1 | 9/1981 |
| DE | 4115831 A1 | 11/1992 |
| DE | 10005202 A1 | 11/2000 |
| DE | 19922799 A1 | 11/2000 |
| DE | 10250826 A1 | 5/2004 |
| DE | 102008019147 A1 | 10/2009 |
| DE | 102010015199 A1 | 10/2011 |
| EP | 0415870 A2 | 3/1991 |
| EP | 0626252 A1 | 11/1994 |
| EP | 1584462 A2 | 10/2005 |
| EP | 1724098 A1 | 11/2006 |
| EP | 2159310 A1 | 3/2010 |
| EP | 2314435 A2 | 4/2011 |
| EP | 2433784 A1 | 3/2012 |
| GB | 2452298 A | 3/2009 |
| JP | H03287824 A | 12/1991 |
| WO | 03099545 A1 | 12/2003 |
| WO | 2008056980 A2 | 5/2008 |
| WO | 2009077581 A2 | 6/2009 |
| WO | 2009124724 A1 | 10/2009 |
| WO | 2009127456 A1 | 10/2009 |
| WO | 2009158262 A1 | 12/2009 |
| WO | 2011128110 A1 | 10/2011 |
| WO | 2012035105 A | 3/2012 |
| WO | 2012136391 A1 | 10/2012 |
| WO | 2012136392 A1 | 10/2012 |
| WO | 2012136393 A1 | 10/2012 |
| WO | 2012136394 A1 | 10/2012 |

OTHER PUBLICATIONS

Communication mailed Jul. 10, 2014 from EPO in related EP application No. 12 713 881.6, including English translation of substantive portions.

English translation of Written Opinion for parent PCT application No. PCT/EP2012/001422.

Unpublished U.S. Appl. No. 14/394,182.

Office Action mailed Apr. 2, 2015 in related U.S. Appl. No. 13/641,247.

English translation of International Search Report for parent PCT application No. PCT/EP2012/001422.

* cited by examiner

Fig. 1A
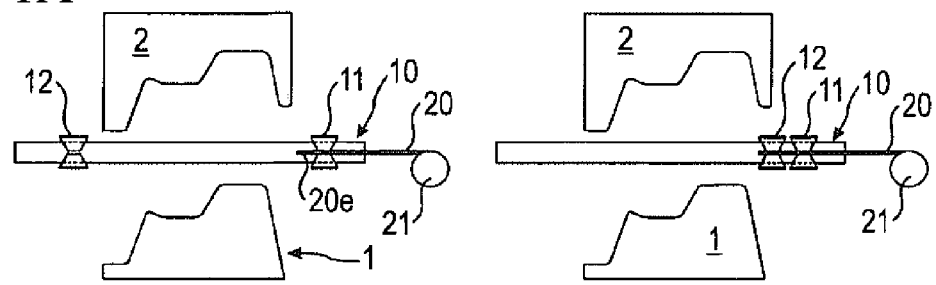
Fig. 1A-B
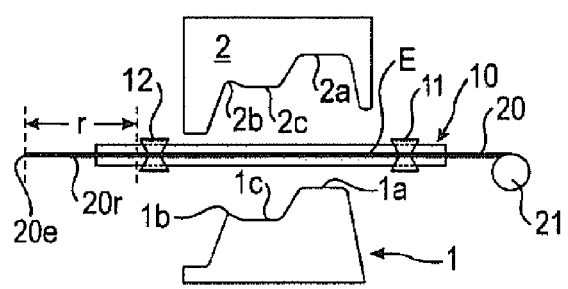
Fig. 1B
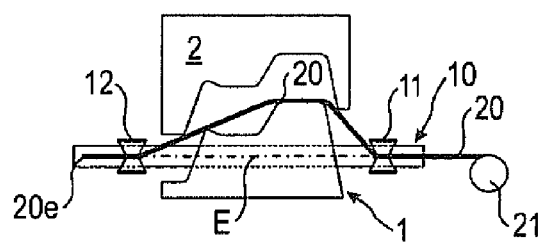
Fig. 1C
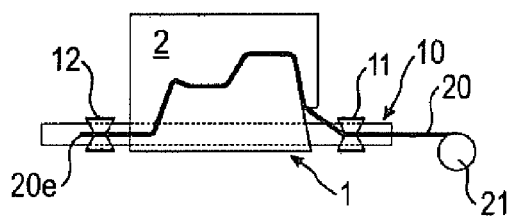
Fig. 1D
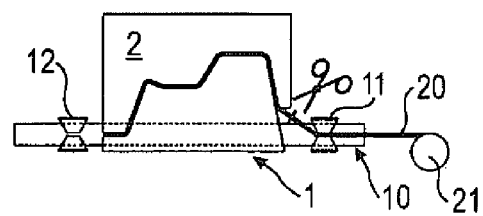
Fig. 1E

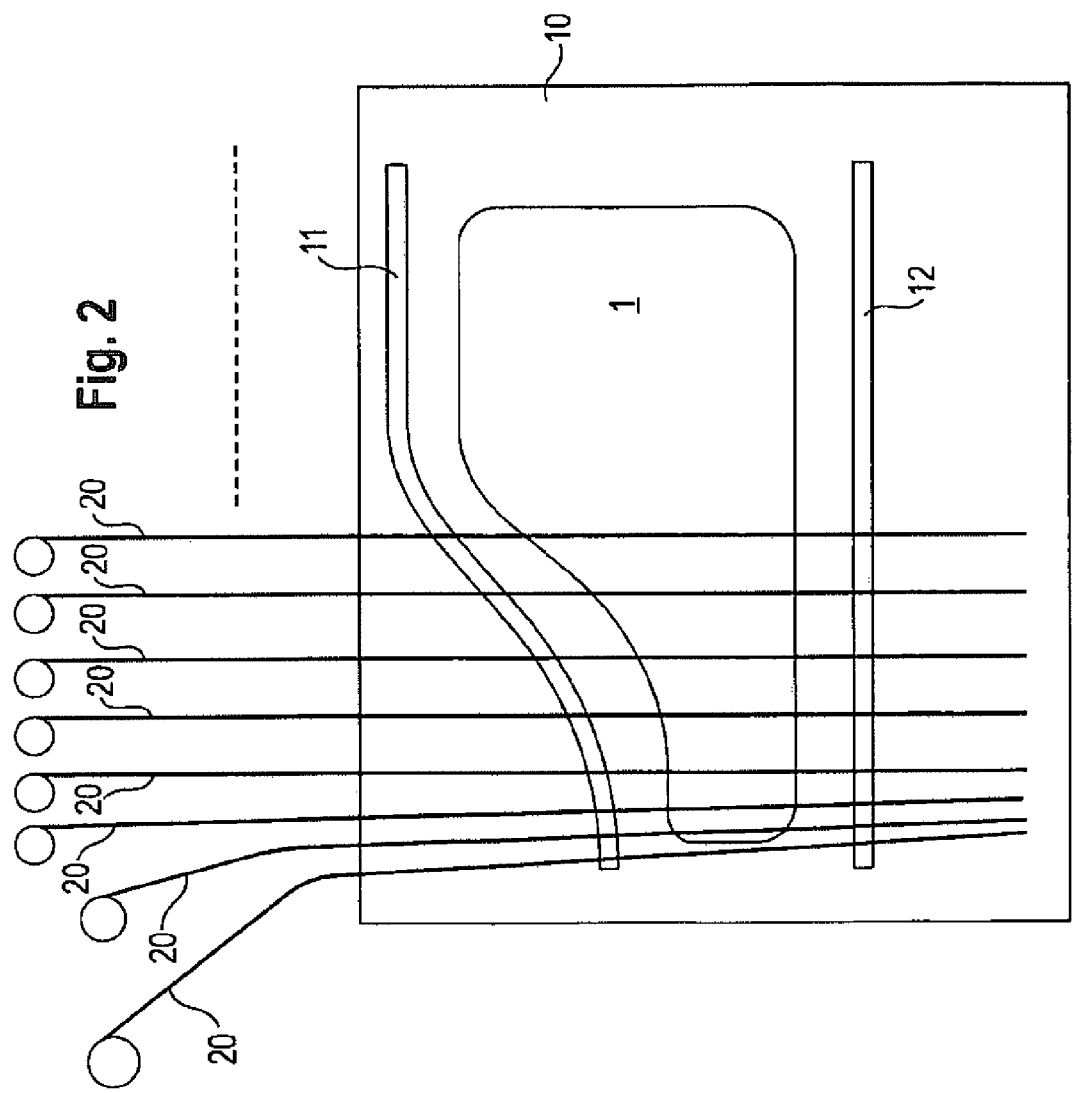

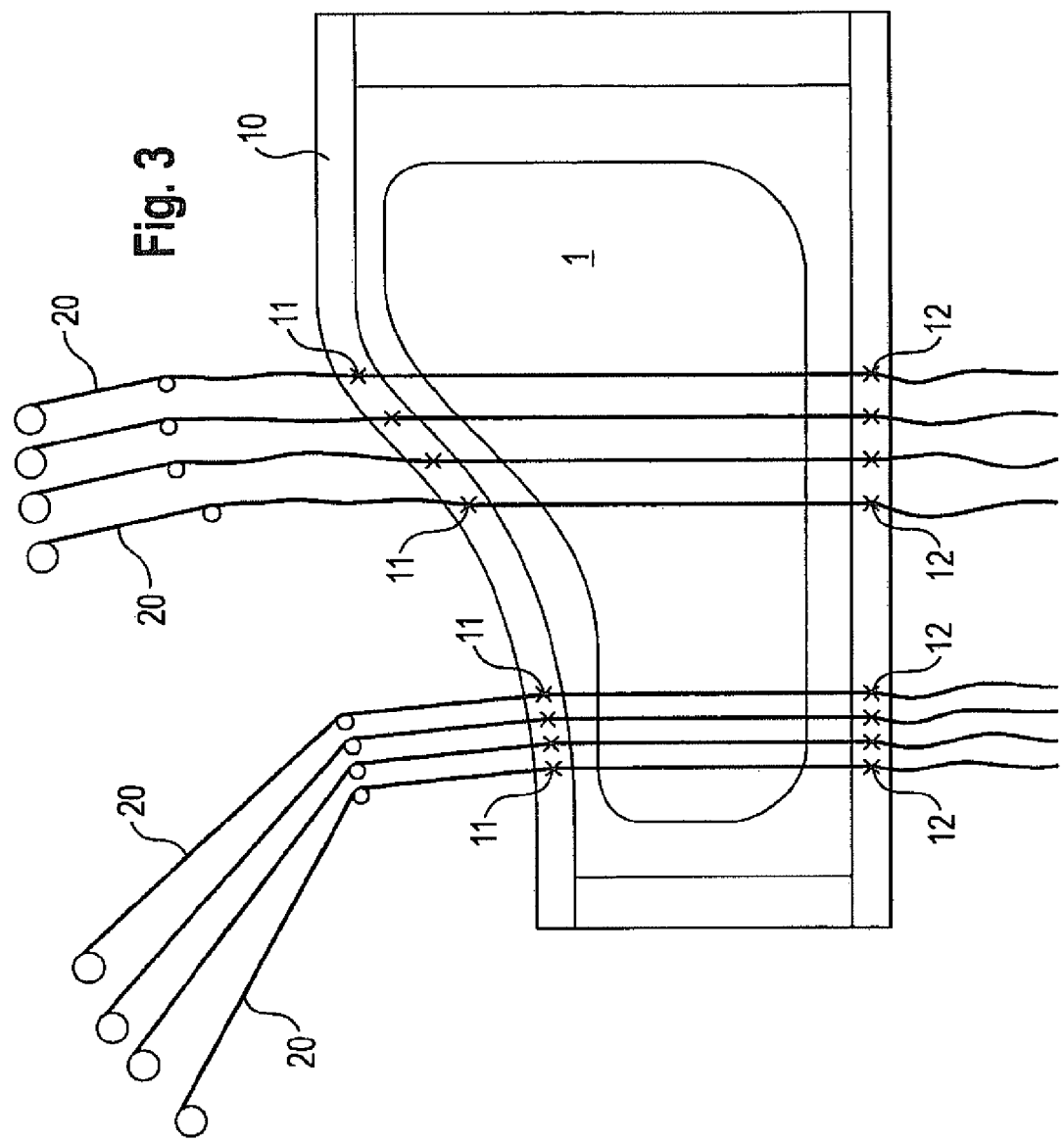

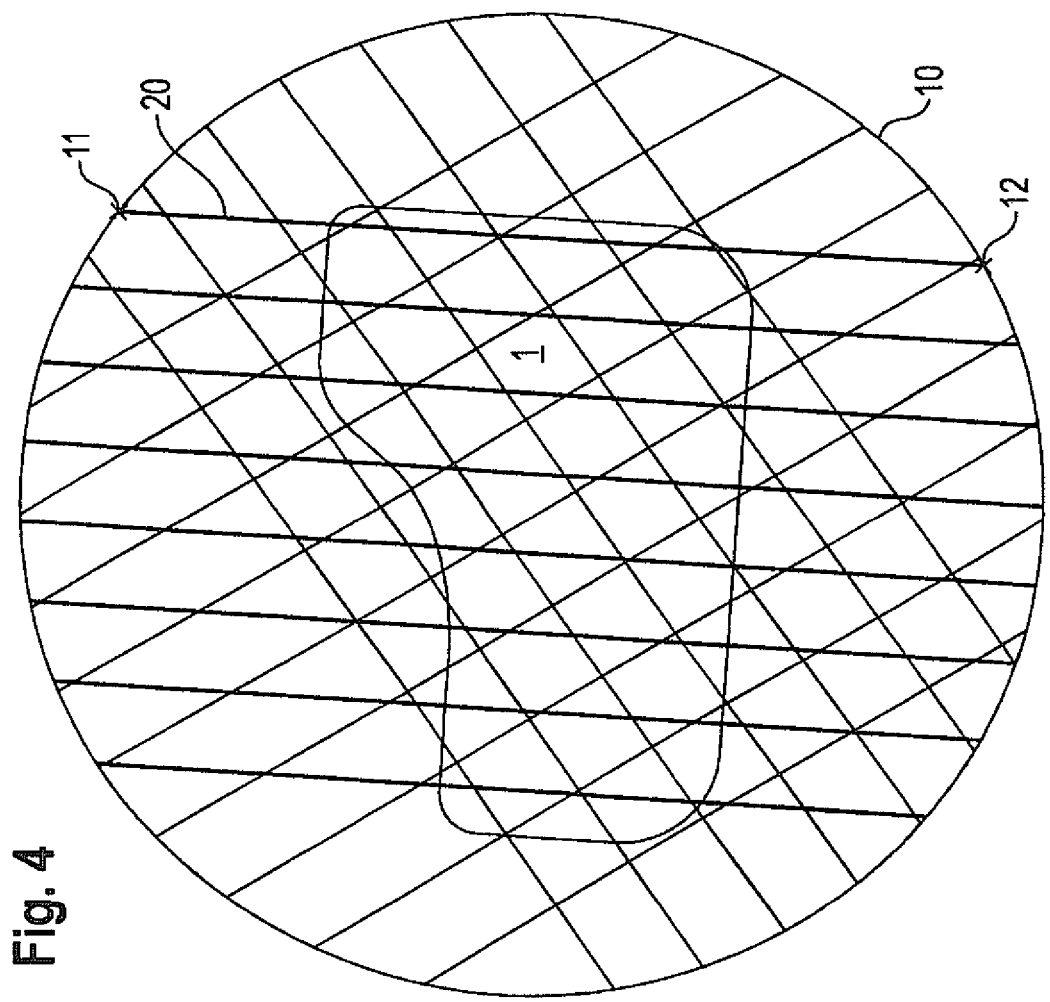

METHOD AND APPARATUS FOR PRODUCING LAID FIBRE FABRICS AND COMPONENT PREFORMS MADE OF FIBRES

CROSS-REFERENCE

This application is the U.S. national stage of International Application No. PCT/EP2012/001422 filed on Mar. 30, 2012, which claims priority to German patent application no. 10 2011 100 640.4 filed on May 5, 2011.

TECHNICAL FIELD

The invention relates to methods and devices for manufacturing fiber layers and structural component preforms made of fibers, in particular using frames having elastic fiber tensioning.

RELATED ART

Nowadays, components made of fiber composite materials are mostly manufactured from a plurality of layers of sheet-like semi-finished products such as fabrics or fiber layers. In this case, the layers can be dry (preform technology) or infiltrated with matrix resin (prepreg technology). In this case, the semi-finished products are manufactured from individual yarns comprised of reinforcing fibers, such as for example from rovings. For the manufacture of components, cut sheets are produced from such semi-finished products, which cut sheets are then—usually manually—laid on a positive mold or negative mold corresponding to the component geometry. The cut sheets are placed over the mold individually or in stacks and—often in a manual process—draped into the component mold. For complex shapes of components having a high deep-drawing ratio, cuts and overlappings in the semi-finished product are necessary, since the stretchability and shearability of the semi-finished products is limited.

Disadvantages of these methods are:
Use of more expensive semi-finished products (value creation step, warehousing of various semi-finished products, cooling and expiration date for prepregs)
Sheet cutting and between 30% and 70% waste (clippings)
Difficult and quality-critical handling of flaccid individual cut sheets
Shaping of semi-finished products is limited
Many manual process steps
Long processing time, high material costs, limited reproducibility

SUMMARY

In one aspect of the present teachings, a device and a method for manufacturing fiber layers and component fiber preforms made of fibers are provided that at least partially overcome these disadvantages.

In one aspect of the present teachings, a method for manufacturing fiber layers and/or component preforms from fibers may preferably include:
a) tensioning a plurality of yarns in a tensioning plane;
b) moving a workpiece carrier through the tensioning plane in a direction substantially perpendicular to the tensioning plane;
c) fixing the yarns on the workpiece carrier to form the fiber layer and/or the component preform.

Steps a) to c) optionally may be repeated one or more times. Preferably, the yarns are yieldably held at or proximal to the edge of the tensioning plane in steps a) and b).

In another aspect of the present teachings, a device for manufacturing fiber layers and/or component preforms from fibers may preferably include:
a tensioning device configured to tension a plurality of yarns in a tensioning plane, the tensioning device including a holding device for yieldably holding the yarns in an individual manner,
a workpiece carrier having a contour corresponding to the fiber layer to be manufactured and/or to the component preform, and
a device configured to move the tensioning device relative to the workpiece carrier, or vice versa, such that the workpiece carrier is movable at least partially through the tensioning plane in a direction that is at least substantially perpendicular to the tensioning plane.

Preferably, the holding devices may be designed as grippers that yieldably hold the yarns at the edge of the tensioning plane by an elastic or force-controlled holding technique. In case the tensile force on any one or more of the yarns exceeds a predetermined tensile force, an additional length of yarn is supplied from a coil or reserve to the portion of the to-be-manufactured fiber layer or component perform that contacts, and is subsequently fixed to, the workpiece carrier.

Among other things, methods and devices are disclosed herein that enable the automated manufacture of dry preforms (preforms) and of preforms having integrated matrix material (prestacks, e.g. prepregs) for components made from fiber composite materials, which components may have a two-dimensional (planar) extension (2D), such as plates, or may have a three-dimensional (non-planar) extension (3D) with a complex geometry such as handles, body panels, etc. In the present specification, preforms are molded parts having geometries, which are similar to structural components and which are made from reinforcing yarns and optionally additives for the further processing. In this case, the preforms, i.e. both dry preforms and prestacks, can be packed in handling (shipping) bags made of foils, or plastic moldings.

For covering a flat or three-dimensional component mold, a plurality of yarns, preferably rovings, are held in a tensioning plane using a device for elastically tensioning the yarns, in particular using a frame having elastic yarn tensioning. The yarns are thus preferably elastically held laterally on both sides of the tensioning plane, wherein an additional (reserve) length of the yarn can subsequently be supplied on at least one side. The yarns extend in the tensioning plane, e.g. in the frame, in a straight-line manner from one side to the opposite side. The yarns can be made to completely cover the surface of the tensioning plane by laying the yarns adjacent to one another in the tensioning plane, i.e. for example in the frame.

A workpiece carrier in the shape of a molding tool ("positive tool") having the geometry of the component or a suitable pre-geometry is pushed at least substantially perpendicularly through the tensioning plane, i.e. for example from above or below through the frame (or the tensioning plane or the frame moves over the tool, i.e. relative to each other). In this way, the yarns located in the tensioning plane (in the frame) are bent and tensioned over the tool mold. A second molding tool ("negative tool") can assist, from the opposite direction, in shaping the fiber layer. The yarns are thus yieldably (i.e. for example elastically or using slippage or the like) held in the tensioning plane, i.e. for example in the tensioning frame. Consequently, in case additional yarn lengths are required due the movement of workpiece carrier relative to the tensioning plane (and the possible relative movement of the further molding tool), such additional yarn lengths can be supplied from the reserve length of the yarn provided at at least one edge of the workpiece carrier, so that the workpiece carrier is covered with appropriately tensioned yarns during the deep-drawing of 3D shapes. Thus, it is preferable that each yarn is separately yieldably held in an individual manner; even more preferably, the yarns are yieldably held on both lateral sides of the tensioning plane.

One or more tensioning planes can be utilized. A plurality of tensioning planes can preferably be realized by using one or more frames disposed one-over-the-other. A square or rectangular frame in plan view can hold e.g. one or two tensioning planes, each having fiber sets tensioned parallel to one another; a hexagonal frame can tension three such tensioning planes, etc. A plurality of tensioning planes can also be realized with a plurality of frames, which are disposed one-over-the-other in a direction substantially perpendicular to the tensioning planes. In this way, a plurality of yarn layers can be produced or deposited on the workpiece carrier, simultaneously and with an appropriate orientation of the yarns. The yarn orientations can thus be different in all frames, so that a cross pattern arises. By appropriately designing the frame or by using two auxiliary frames, the yarns of all layers can be brought into contact as necessary, so that upon removal and/or deep drawing, they behave as a single layer and e.g. can simultaneously be brought into contact with the positive tool.

The application of the yarns is thus effected such that only minimally more yarn lengths are yieldably held, i.e. for example in the frame, than are needed for covering the component mold (workpiece carrier).

For this purpose the frames are preferably matched to the component contour such that the holding points in each frame lie close to the component periphery. Alternatively, the holding points can be adjustable instead of the frame.

Tensioning and removal are preferably performed as follows. At the holding points on one lateral side of the tensioning plane, i.e. preferably a lateral frame side (introduction side), the yarns from yarn coils are introduced and held ready for use. The yarn ends are transported (e.g. drawn), e.g. using grippers, from a holding point on the introduction side to a holding point on the opposing lateral side of the tensioning plane, i.e. preferably the opposing lateral frame side (introduction side). On the target side, the holding point or the positioning of the (each) gripper is selected such that an individual yarn reserve (additional yarn length) is held ready for use. This yarn reserve preferably corresponds to the length of yarn that is drawn out of the tensioning plane (the frame plane) upon the matching to the contour of the component or workpiece carrier. Thus for example upon submerging the molding tool through the frame, the yarns on the introduction side can be redrawn directly from the coils, while on the target side the required additional yarn length can be drawn from this reserve.

After completing the molding process, the yarns are severed on the introduction side and are released from the holding points on the target side.

The layers shaped in one molding step are held in one of the two molding tools (e.g. using a vacuum, needles, adhesive materials, grippers, clamps, freeze grippers) and the two molding tools can be separated and return to their initial positions.

The term "yarns" herein generally indicates rovings or tows made from reinforcing fibers and matrix fibers or auxiliary fibers made from e.g. carbon, glass, aramid, basalt, or other materials. Wide tows (so-called heavy tows), foil strips or strips of auxiliary materials also can be processed (utilized) as yarns in accordance with the present teachings.

Variants and specific embodiments of the present teachings include:

Covering of the tensioning plane (of the frame) over the entire surface or only partially (e.g. a strip only in the center or at the edges);

Yieldable holding of the yarns at the edge(s) of the tensioning plane (frame edge)—elastically (spring, pneumatic) or force-controlled (slippage in clamping, guiding over a braked pulley, weight);

Simultaneous or sequential application of the yarns in the tensioning plane(s) or on the frame(s);

Positive tool can be solid, or elastic in parts, or multipart;

Negative tool can be solid, or fully elastic or elastic in parts, or also multipart;

Tool actuators can be mechanical or pneumatic or hydraulic. (Stamps, membranes . . . );

The individual solid and elastic parts of positive and negative tools can be independently controlled and sequentially moved;

The movement of positive and negative tools toward the tensioning plane or toward the frame can be effected in a straight-line manner or on curved paths, with and without additional rotation (e.g. rolling movement when submerging into the frame);

Positive and negative tools can be heated and can exert pressure on the fiber layer (e.g. for compacting, activating of binders, and consolidating of the preform);

Additional materials such as polymer yarns, polymer foils, and webs, can be used between the layers (e.g. analogously to the reinforcing fiber yarns), in order to assist the reshaping and cohesion of the preform (e.g. adhering or fusible yarns, foils, webs, resin films, thermoplastic yarns or foils or webs . . . );

The reshaping can be assisted and controlled by inserting or laying-on (between or on the reinforcing fiber layers) special membranes, foils, or webs, wherein these membranes, foils, or webs have locally-adjustable stretchability and shearability;

The grippers can move out (away) from the target side over the frame, grip (pick up) the yarn ends, and draw them (back) over the frame. The grippers thus move farther than to the end of the component contour, in order to produce the yarn reserve on the target side.

The grippers can be individually moved;

Alternatively, the two opposing holding points of a frame can move together (e.g. on a frame part) towards each other, grip all yarn ends, and tension the yarns over the frame in the subsequent movement of the holding points away from each other;

Alternatively, the frame can itself be elastic, and thus provide the required yielding property when holding the yarns;

Specific embodiment of the frame, the holding points, and the grippers;

Multi-stage shaping (primary shaping→raw geometry;

Secondary shaping→finished geometry) are possible; and

The heating and/or compressing of the preform also serve(s) in particular to provide an intermediate fixing of the layers and/or an improved handling.

Advantages:

Fast production times (automation, simultaneous applying of one or more entire layers, automatic shaping without intermediate handling/treatment);

Low waste, thereby significant reduction of material costs;

Direct production of components from fiber materials and, optionally, matrix materials and/or auxiliary materials; no semi-finished products necessary; thereby cost reductions in material procurement and warehousing;

Any complex geometries are manufacturable, since there are no limitations with respect to shearing or stretching, which has been a problem for semi-finished products;

High reproducibility due to automation.

BRIEF DESCRIPTION OF THE DRAWINGS

Further advantages and useful characteristics follow from the description of exemplary embodiments referring to the Figures:

FIGS. 1A-1E, as well as FIG. 1A-B show schematic sectional views of an embodiment of a device according to the present teachings at various stages of a method according to the present teachings.

FIG. 2 shows a schematic plan view of an embodiment of the device.

FIG. 3 shows a schematic plan view of a further embodiment of the device.

FIG. 4 shows a schematic plan view of a further embodiment of the device.

DETAILED DESCRIPTION OF THE INVENTION

In FIG. 1A, a frame 10 is shown in a schematic sectional view. By using this frame 10, yarns 20, which are supplied from yarn coils 21, can be yieldably tensioned in a tensioning plane. Holding devices 11, 12 are provided on the frame 10. In the embodiment shown in FIG. 1, these holding devices 11, 12 preferably are designed as grippers 11, 12, which hold the yarns 20 in a force-controlled (force-mediated) manner by clamping and thereby allow a force-controlled (force-mediated) slippage of the yarns. One yarn end 20e is drawn from right to left in FIG. 1A from the right lateral side of the frame (tensioning plane) 10 to the opposite (left) side of the frame (tensioning plane) 10 and is held on the right in the gripper 11 and on the left in the gripper 12 (see FIG. 1B). A reserve segment 20r of the yarn is thus provided laterally outside the gripper 12, which reserve segment 20r has a length r. The drawing (pulling) of the yarn may be effected using a yarn-drawing (yarn-pulling) device that is not shown in FIG. 1. In the alternative, the gripper 12 may be moved, as shown in FIG. 1A-B, towards the yarn roll 21, may grip the yarn 20 there proximal to the yarn end 20e, and may then draw (pull) the yarn end 20e to the position shown in FIG. 1B. A positive (convex) tool 1 and a negative (concave) tool 2 respectively having complementary projections 1a, 1b, 2c and recesses 2a, 2b, 1c are shown in FIG. 1. As can be clearly seen by comparing FIG. 1B to 1D, the yarns 20, which are first tensioned in the tensioning plane, are drawn out of the tensioning plane by movement of the positive tool 1 perpendicular thereto, and abut on the contour of the tool (workpiece carrier) 1. As can be clearly seen by comparing FIGS. 1B and 1C, a first part of the reserve length r is thus used as the yarns 20 are drawn through the slip holder (=gripper 12). Analogously, yarns 20 are guided back from the side of the yarn coil 21 through the slip holder (=gripper 11). When the negative mold 2 is lowered in the opposite direction, as shown in FIG. 1D, the complementary projections 1a, 1b, 2c and recesses 2a, 2b, 1c form (shape) the preform, i.e. form (shape) the component in a manner similar to deep-drawing. Again, the necessary additional yarn length is supplied via the slip holders 11, 12.

The yarns 20 are subsequently cut in the vicinity of the grippers 11 located on the sides of the yarn coils 21 (see FIG. 1E). Optionally, they can be cut also on the other side, even though the excess yarn length, which is possibly still present there, is already lost (used up due to central portion of the yarns 20 being drawn out of the tensioning plane). The cutting direction is schematically shown by scissors.

FIGS. 2 and 3 show alternate arrangements for applying fibers 20 to the frame 10, wherein the yarns 20 are separately and individually held by each of the grippers 11, 12. FIG. 4 shows two layers of yarns 20 disposed on the frame 10 in different orientations.

The variants and specific embodiments described above in the Summary section can also be used in the described schematic (detailed) embodiment.

It is explicitly stated that all features disclosed in the description and/or the claims are intended to be disclosed separately and independently from one another for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention.

The invention claimed is:

1. A method for manufacturing a laid fiber fabric or a component preform, comprising:
   (a) tensioning a first plurality of yarns in a first tensioning plane using a frame configured to yieldably tension the yarns such that each individual yarn is separately held in a yieldable manner;
   (b) moving a workpiece carrier through the first tensioning plane in a direction that is at least substantially perpendicular to the first tensioning plane; and
   (c) fixing the yarns on the workpiece carrier so as to form the laid fiber fabric or the component preform,
   wherein each of the yarns is separately, individually and yieldably held at both first and second opposing lateral edges of the at least one tensioning plane such that, on at least one of the first and second edges, additional lengths of the first plurality of yarns are respectively supplyable, in an individual and independent manner, to cover the workpiece carrier during step (b).

2. The method according to claim 1, wherein:
   step (a) further comprises tensioning a second plurality of yarns in a second tensioning plane such that each of the second plurality of yarns is separately and individually held in a yieldable manner; and
   in step (b) the workpiece carrier simultaneously moves through the first and second tensioning planes.

3. The method according to claim 2, wherein the first tensioning plane is at least substantially parallel to the second tensioning plane.

4. The method according to claim 3, further comprising (i) impregnating the yarns with a matrix resin to form a prepreg or (ii) inserting an additional material between the first plurality of yarns and the second plurality of yarns, the additional material being selected from the group consisting of polymer yarns, polymer foils and polymer webs.

5. The method according to claim 3, wherein each of the first and second plurality of yarns comprises at least one roving or at least one tow comprised of a plurality of fibers.

6. The method according to claim 5, wherein in step (b) the additional lengths of the first and second plurality of yarns are respectively supplied from respective yarn coils and/or from respective yarn reserves to cover the workpiece carrier when a predetermined tensile force is exceeded on one or more of the first and second plurality of yarns.

7. The method according to claim 1, wherein:
step (a) further comprises tensioning a second plurality of yarns in a second tensioning plane such that each of the second plurality of yarns is separately and individually held in a yieldable manner; and
in step (b) the workpiece carrier simultaneously moves through the first and second tensioning planes.

8. The method according to claim 1, further comprising (i) impregnating the yarns with a matrix resin to form a prepreg or (ii) disposing an additional material on the first plurality of yarns, the additional material being selected from the group consisting of polymer yarns, polymer foils and polymer webs.

9. The method according to claim 1, wherein each of the yarns comprises a roving or tow comprised of a plurality of fibers.

10. A device for manufacturing a laid fiber fabric or a component preform, comprising:
a first tensioning device configured to tension a first plurality of yarns in a first tensioning plane using a first frame configured to separately hold and tension each individual yarn, the frame including a first plurality of holding devices configured to separately and yieldably hold the respective yarns of the first plurality of yarns, and
a workpiece carrier having a contour corresponding to the laid fiber fabric or the component preform to be manufactured, wherein the workpiece carrier is configured to be movable relative to the tensioning device such that (i) the workpiece carrier is movable at least partially through the first tensioning plane in a direction at least substantially perpendicular to the first tensioning plane and (ii) the first plurality of yarns contacts the workpiece carrier and bends according to the contour of the workpiece carrier,
wherein the device is configured to separately, individually and yieldably hold each of the first plurality of yarns at both first and second opposing lateral edges of the at least one tensioning plane such that, on at least one of the first and second edges, additional lengths of the plurality of yarns are respectively supplyable in an individual and independent manner.

11. The device according to claim 10, wherein the first plurality of holding devices comprises a first plurality of individually-operable grippers respectively configured to individually and yieldably hold the respective yarns of the first plurality of yarns at an edge of the first tensioning plane by an elastic or force-controlled retention.

12. The device according to claim 11, further comprising:
a second tensioning device configured to tension a second plurality of yarns in a second tensioning plane and including a second plurality of holding devices configured to separately, individually and yieldably hold the respective yarns of the second plurality of yarns, the second tensioning plane being at least substantially parallel to the first tensioning plane.

13. The device according to claim 12, wherein the first plurality of yarns extends in a direction that is oblique or perpendicular to the second plurality of yarns.

14. The device according to claim 13, wherein the first and second plurality of holding devices each respectively comprise at least one device selected from the group consisting of a spring, a pneumatic device, a clamp, a braked guide pulley and a weight, wherein the clamp is configured to permit slippage of the respective yarn therethrough when a predetermined tensile force on the yarn is exceeded.

15. The device according to claim 10, further comprising:
a second tensioning device configured to tension a second plurality of yarns in a second tensioning plane and including a second plurality of holding devices configured to separately, individually and yieldably hold the respective yarns of the second plurality of yarns, the second tensioning plane being at least substantially parallel to the first tensioning plane,
wherein the first plurality of yarns extends in a direction that is oblique or perpendicular to the second plurality of yarns.

16. The device according to claim 10, wherein the first plurality of holding devices respectively comprises a plurality of clamps each configured to permit individual slippage of the respective yarn therethrough when a predetermined tensile force on the respective yarn is exceeded.

17. The device according to claim 10, wherein the first plurality of holding devices comprises a first plurality of individually-operable grippers.

18. A method for manufacturing a laid fiber fabric or a component preform, comprising:
(a) pulling a plurality of yarns from a plurality of yarn coils across a frame and yieldably and respectively fixing the individual yarns of the plurality of yarns under tension in a first tensioning plane in a plurality of individually-operable and individually-movable grippers disposed along at least one edge of the frame, wherein a reserve length of the yarns is maintained on the at least one edge of the frame,
(b) deep-drawing the plurality of yarns by moving a tool mold, which has a contour that is at least partially convex, through the first tensioning plane in a direction that is at least substantially perpendicular to the first tensioning plane such that the plurality of yarns contacts the tool mold and bends according to the contour of the tool mold, wherein when a predetermined tensile force on any one or more of the grippers is exceeded, at least a portion of the reserve length of the respective yarn slips through the respective gripper and is supplied to cover the workpiece carrier, and
(c) severing or releasing the yarns along an edge of the tool mold so as to form the laid fiber fabric or the component preform.

19. The method according to claim 18, wherein each of the yarns are separately and yieldably held at first and second opposing lateral edges of the first tensioning plane such that, on at least one of the first and second edges, additional lengths of the plurality of yarns are respectively supplyable to cover the tool mold during step (b).

20. The method according to claim 19, wherein each yarn is separately, individually and yieldably held on both the first and second opposing lateral edges of the first tensioning plane.

21. The method according to claim 20, wherein:
step (a) further comprises tensioning a second plurality of yarns in a second tensioning plane such that each of the second plurality of yarns is separately and individually held in a yieldable manner; and
in step (b) the tool mold simultaneously moves through the first and second tensioning planes.

22. The method according to claim 21, wherein the first tensioning plane is at least substantially parallel to the second tensioning plane.

23. The method according to claim 22, further comprising (i) impregnating the yarns with a matrix resin to form a prepreg or (ii) inserting an additional material between the first plurality of yarns and the second plurality of yarns, the additional material being selected from the group consisting of polymer yarns, polymer foils and polymer webs.

24. The method according to claim 22, wherein each of the first and second plurality of yarns comprises at least one roving or at least one tow comprised of a plurality of fibers.

25. The method according to claim 24, wherein in step (b) the additional lengths of the first and second plurality of yarns are respectively supplied from respective yarn coils or from respective yarn reserves to cover the tool mold when a predetermined tensile force is exceeded on one or more of the first and second plurality of yarns.

26. The method according to claim 18, wherein:
step (a) further comprises tensioning a second plurality of yarns in a second tensioning plane such that each of the second plurality of yarns is separately and individually held in a yieldable manner; and
in step (b) the tool mold simultaneously moves through the first and second tensioning planes.

27. The method according to claim 26, wherein in step (b) the additional lengths of the first and second plurality of yarns are respectively and individually supplied from respective yarn coils or from respective yarn reserves to cover the tool mold when a predetermined tensile force is exceeded the respective yarn or yarns.

28. The method according to claim 18, further comprising (i) impregnating the yarns with a matrix resin to form a prepreg or (ii) disposing an additional material on the first plurality of yarns, the additional material being selected from the group consisting of polymer yarns, polymer foils and polymer webs.

29. The method according to claim 1, wherein:
in step (a), each of the first plurality of yarns is individually pulled and is yieldably and separately held by one of a plurality of grippers,
in step (b) the additional lengths of the first plurality of yarns are respectively and individually supplied from respective yarn coils or from respective yarn reserves to cover the workpiece carrier when a predetermined tensile force on one or more of the grippers is exceeded such that the additional lengths slip through the respective grippers that are subjected to the predetermined tensile force or higher and no additional lengths are supplied through ones of the grippers that are subjected to a force less than the predetermined tensile force, and
after step (c), the yarns are severed or released along an edge of the workpiece carrier so as to form the laid fiber fabric or the component preform.

30. The device according to claim 10, wherein:
the first plurality of holding devices respectively comprises a plurality of individually-operable grippers each configured to individually pull the respective yarns to cover the workpiece carrier and to permit slippage of the respective yarns therethrough when a predetermined tensile force on the respective gripper is exceeded and to prevent slippage of the respective yarns therethrough when the predetermined tensile force on the respective gripper is not exceeded; and
the device is configured to severe or release the yarns along an edge of the workpiece carrier after the yarns have been bent into the contour corresponding to the laid fiber fabric or the component preform to be manufactured.

* * * * *